US010018138B2

(12) United States Patent
Gargiso et al.

(10) Patent No.: US 10,018,138 B2
(45) Date of Patent: Jul. 10, 2018

(54) METHOD FOR OPERATING A PIEZO INJECTOR

(71) Applicant: Continental Automotive GmbH, Hannover (DE)

(72) Inventors: Tany Gargiso, Donaustauf (DE); Manfred Kramel, Mintraching (DE); Hans-Joerg Wiehoff, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 15/316,627

(22) PCT Filed: Jun. 1, 2015

(86) PCT No.: PCT/EP2015/062092
§ 371 (c)(1),
(2) Date: Dec. 6, 2016

(87) PCT Pub. No.: WO2015/189059
PCT Pub. Date: Dec. 17, 2015

(65) Prior Publication Data
US 2017/0138290 A1 May 18, 2017

(30) Foreign Application Priority Data
Jun. 13, 2014 (DE) .................. 10 2014 211 334

(51) Int. Cl.
F02M 51/06 (2006.01)
F02D 41/20 (2006.01)
(Continued)

(52) U.S. Cl.
CPC ..... F02D 41/2096 (2013.01); F02D 41/2467 (2013.01); F02M 51/0603 (2013.01);
(Continued)

(58) Field of Classification Search
CPC ............ F02M 51/0603; F02M 65/005; F02M 2200/703; F02D 41/2096; F02D 41/2467;
(Continued)

(56) References Cited

U.S. PATENT DOCUMENTS 6,588,678 B1    7/2003  Mattes ........................ 239/102.2
7,419,103 B2*  9/2008  Pauer ................. F02M 51/0603
                                                     239/102.2
(Continued)

FOREIGN PATENT DOCUMENTS

DE         19939520 A1    3/2001
DE      102007059117 A1    6/2009
(Continued)

OTHER PUBLICATIONS

German Office Action, Application No. 102014211334.2, 5 pages, dated Feb. 11, 2015.
(Continued)

Primary Examiner — Christopher Kim
(74) Attorney, Agent, or Firm — Slayden Grubert Beard PLLC

(57) ABSTRACT

The present disclosure relates to fuel injectors. The teachings may be embodied in a method for characterizing a hydraulic coupling element. The fuel injector may have a piston to pressurize a hydraulic medium and a pin connecting the piston to a piezoactuator. The method may include applying a charging current to the piezo actuator low enough that the leakage flow prevents a pressure differential and the nozzle needle remains closed; discharging the piezo actuator with a current high enough to release the mechanical connection between the piston and the pin; detecting when the piston impacts on the pin; and characterizing the coupling element based on the time between discharge and impact.

7 Claims, 2 Drawing Sheets

(51) Int. Cl.
*F02D 41/24* (2006.01)
*F02M 65/00* (2006.01)
*G01M 15/04* (2006.01)

(52) U.S. Cl.
CPC ........ *F02M 65/005* (2013.01); *G01M 15/042* (2013.01); *F02D 2041/2055* (2013.01); *F02D 2041/2058* (2013.01); *F02M 2200/703* (2013.01)

(58) Field of Classification Search
CPC .... F02D 2041/2055; F02D 2041/2058; G01M 15/042
See application file for complete search history.

(56) References Cited

U.S. PATENT DOCUMENTS

| | | | | |
|---|---|---|---|---|
| 7,431,220 B2* | 10/2008 | Kanne | ............... | F02M 51/0603 123/496 |
| 7,455,244 B2* | 11/2008 | Boecking | ........... | F02M 51/0603 239/102.2 |
| 7,644,874 B2* | 1/2010 | Mochizuki | ......... | F02M 51/0603 123/498 |
| 7,703,708 B2* | 4/2010 | Matsumoto | .......... | F02M 47/027 239/102.2 |
| 7,828,228 B2* | 11/2010 | Mochizuki | .......... | F02D 41/2096 239/102.2 |
| 8,342,424 B2* | 1/2013 | Suzuki | ............... | F02M 51/0603 123/467 |
| 8,973,893 B2 | 3/2015 | Lehner et al. | ........... | 251/129.06 |
| 9,273,627 B2 | 3/2016 | Brandt | | |
| 2006/0219805 A1* | 10/2006 | Boecking | ............ | F02M 47/027 239/96 |
| 2007/0001032 A1* | 1/2007 | Boecking | ............ | F02M 47/027 239/533.3 |
| 2007/0221745 A1 | 9/2007 | Stoecklein et al. | ............. | 239/88 |
| 2011/0272499 A1 | 11/2011 | Venkataraghavan et al. | ............................. | 239/584 |

FOREIGN PATENT DOCUMENTS

| | | |
|---|---|---|
| DE | 102010021169 A1 | 11/2011 |
| DE | 102011003751 A1 | 8/2012 |
| DE | 102011007580 A1 | 10/2012 |
| EP | 1394397 A2 | 3/2004 |
| WO | 2005/098229 A1 | 10/2005 |
| WO | 2015/189059 A1 | 12/2015 |

OTHER PUBLICATIONS

International Search Report and Written Opinion, Application No. PCT/EP2015/062092, 19 pages, dated Aug. 28, 2015.

\* cited by examiner

METHOD FOR OPERATING A PIEZO INJECTOR

CROSS-REFERENCE TO RELATED APPLICATIONS

This application is a U.S. National Stage Application of International Application No. PCT/EP2015/062092 filed Jun. 1, 2015, which designates the United States of America, and claims priority to DE Application No. 10 2014 211 334.2 filed Jun. 13, 2014, the contents of which are hereby incorporated by reference in their entirety.

TECHNICAL FIELD

The present disclosure relates to nozzles and actuators. The teachings thereof may be embodied in methods for operating a piezo injector.

BACKGROUND

A new generation of fuel injection systems, in particular common-rail fuel injection systems, operates with directly driven piezo injectors actuating the nozzle needle via a hydraulic coupling element. In this context, the coupling element converts the translatory stroke of the piezo drive into a pressure differential which opens the nozzle needle. The coupling element comprises a piston and a pin which connects the piston to a piezo actuator. The piston is located in a pressure cylinder. When the piezo actuator extends, pressure is applied to fuel located in the pressure cylinder and under high pressure. This moves a nozzle needle to open an injection opening and fuel is thereby injected into a combustion chamber. Discharging the piezo actuator shortens its length, as a result of which the piston of the coupling element moves back and therefore brings about a reduction in pressure of the fuel, which reduction causes the nozzle needle to close the injection opening.

The transmission properties of such a coupling element are, apart from the physical characteristic variables of the fuel, dependent to a high degree on the leakage fluid that flows around the coupling element. A balance of inflowing, outflowing, and circulating quantities is established, which balance influences the respective dynamic transmission behavior and therefore the opening and closing of the needle. This balance changes as a function of temperature, viscosity, component tolerance, and aging, i.e., the gap cross section. To correct the actuation, it is useful to know the state of this balance. Known models find the temperature influence statistically by means of characteristic diagrams. However, until they do not detect the aging and component tolerance of such a hydraulic coupling element.

SUMMARY

The teaching of the present disclosure may be embodied in methods with which particularly precise actuation of the piezo actuator can be achieved. The methods may include characterizing a hydraulic coupling element having a piston which places a hydraulic medium under pressure and a pin which connects said piston to a piezo actuator, said coupling element converting the translatory stroke of the piezo actuator into a pressure differential which opens the nozzle needle of a piezo injector.

For example, some embodiments may include a method for characterizing a hydraulic coupling element having a piston which places a hydraulic medium under pressure and a pin which connects said piston to a piezo actuator, said coupling element converting the translatory stroke of the piezo actuator into a pressure differential which opens the nozzle needle of a piezo injector. The method may include the following steps: carrying out a test actuation of the piezo actuator (1) with a very low charging current (21), with the result that the piezo actuator (1) moves so slowly that the leakage flow produced by the coupling element prevents a pressure differential, and the nozzle needle (7) therefore remains closed; discharging of the piezo actuator (1) by a very high current (22), with the result that the mechanical connection between the piston (3) and the pin (2) is released; generating a signal when the piston (3) impacts on the pin (2); detecting this signal; measuring the time from the start of discharging to the impacting of the piston (3) on the pin (2); and using the measured time to characterize the coupling element.

In some embodiments, the measured time is used to monitor the wear of the coupling element.

In some embodiments, the measured time is used to correct the actuation of the piezo injector.

BRIEF DESCRIPTION OF THE DRAWINGS

The teachings of the present disclosure will be explained in detail below using an exemplary embodiment and in conjunction with the drawings, in which.

DETAILED DESCRIPTION

This teachings of the present disclosure may be embodied in a method including: carrying out a test actuation of the piezo actuator with a very low charging current, with the result that the piezo actuator moves so slowly that the leakage flow produced by the coupling element prevents a pressure differential, and the nozzle needle therefore remains closed; discharging of the piezo actuator by a very high current, with the result that the mechanical connection between the piston and the pin is released; generating a signal when the piston impacts on the pin; detecting this signal; measuring the time from the start of discharging to the impacting of the piston on the pin; and using the measured time to characterize the coupling element.

In such a method the coupling element is subjected to a test actuation. This test actuation applies a very low charging current by which the piezo actuator is moved so slowly that the leakage circulation which is produced prevents a pressure differential, and the nozzle needle therefore remains closed. The piezo actuator is then discharged by a high current. The piston of the coupling element cannot follow the rapid movement of the piezo actuator at the same speed, with the result that the mechanical connection between the piston and the pin is released. The piston follows with a damped speed, which is limited by the possibility of equalizing the fluid volume upstream and downstream of the piston. When the piston impacts on the pin of the actuator, the force effect acting on the piezo element causes a signal to be generated, which can be detected as a change in capacitance or voltage or current.

The time from the start of discharging until the impacting of the piston characterizes the thermo-hydraulic and tribological state of the coupling element, and is used to characterize the coupling element. The measured time period is an indication of the state of the coupling element. It is therefore possible to assume, for example, that given a relatively short time period a relatively high degree of wear of the coupling element is present, since a relatively large gap is present between the wall of the pressure cylinder and the piston, and there is therefore a relatively strong circulation around the piston. Conversely, in the case of a relatively long time period, the wear of the piston is relatively low, since the circulation gap is small.

In some embodiments, the measured time is therefore used to monitor the wear of the coupling element.

In some embodiments, the measured time is used to correct the actuation of the piezo injector.

Figure 1:
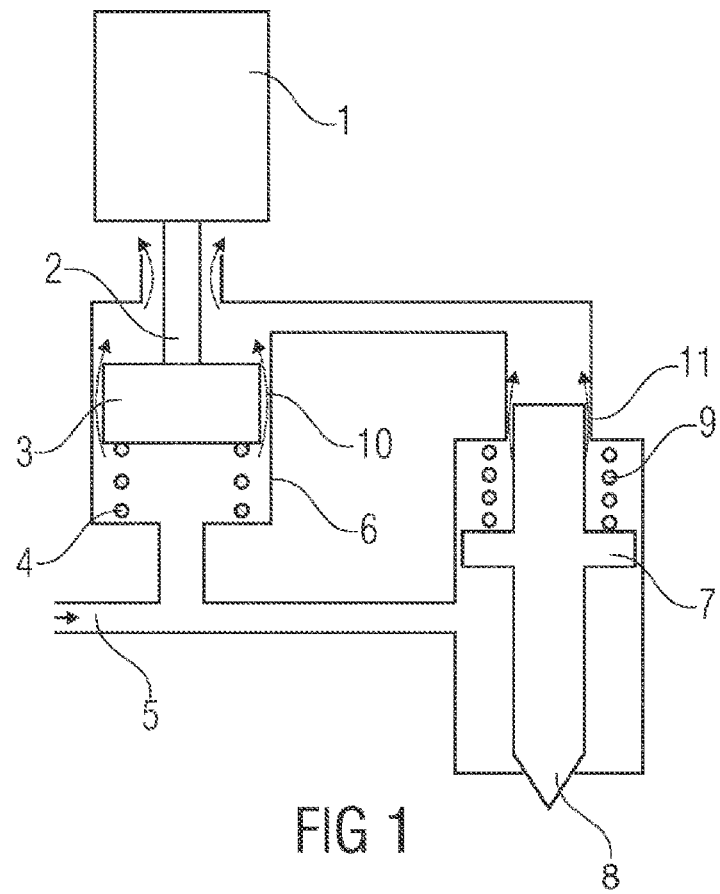
FIG. 1 shows a schematic illustration of an injector which is driven directly by means of a piezo actuator and a hydraulic coupling element.

The injector which is illustrated schematically in FIG. 1 can be, for example, part of an injection system, having a pressure accumulator (rail), of a motor vehicle. The injector has a nozzle needle 7 which opens and closes an injection opening 8.

A spring 9 presses the nozzle needle 7 downward in the figure, to close the injection opening 8. Fuel under high pressure is fed via the line 5. If the pressure of the fuel exceeds the pressure applied by the spring 9, the nozzle needle 7 is moved upward in the figure, in order to open the injection opening 8 and to inject a metered quantity of fuel into a combustion chamber. If the fuel pressure drops, the injection opening 8 is closed again by the nozzle needle 7 as a result of the action of the spring 9.

The drive of the injector may comprise a piezo actuator 1 and a coupling element which converts the translatory stroke of the piezo actuator 1 into a pressure differential which opens the nozzle needle. Here the, the piezo actuator 1 is connected via a pin 2 to a piston 3 which has a loose mechanical coupling to the pin 2. The piston 3 moves in a pressure cylinder 6 in which a spring 4 is arranged. By lengthening the piezo actuator 1, the piston 3 is moved downward in the figure via the pin 2 counter to the force of the spring 4, and in the process places the fuel, flowing by the line 5, under pressure, so that the nozzle needle 7 opens the injection opening 8 and a corresponding quantity of fuel is injected. At 10, a gap 10 which is present between the pressure cylinder 6 and the piston surface is illustrated, through which gap 10 a leakage flow flows past the piston. A corresponding leakage flow flows past the nozzle needle via the gap 11 and into the associated coupling space.

Figure 3:
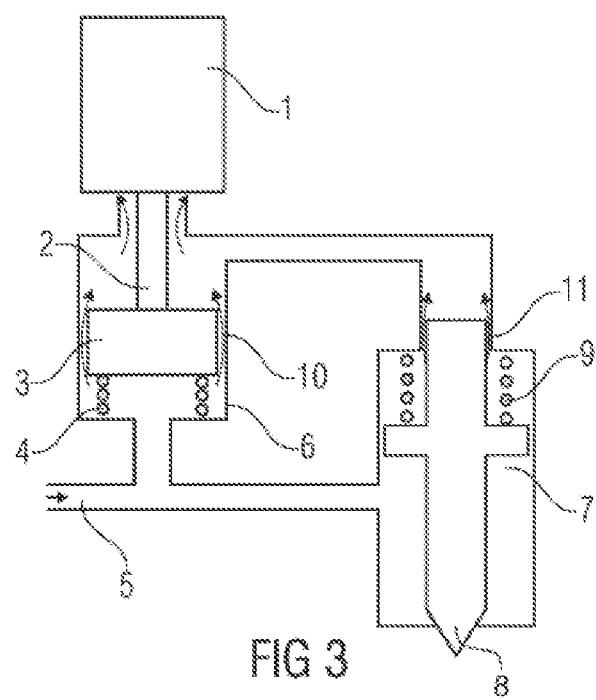
FIG. 3 shows a schematic illustration like FIG. 1, which shows the piezo actuator in the extended state without movement of the nozzle needle.

To characterize the coupling element which comprises the piston 3, a test actuation of the piezo actuator 1 is carried out. In this context, a very low charging current is applied to the piezo actuator 1, with the result that said piezo actuator 1 moves so slowly that the leakage flow produced by the coupling element prevents a pressure differential, and the nozzle needle 7 therefore remains closed. This state is illustrated in FIG. 3.

Figure 4:
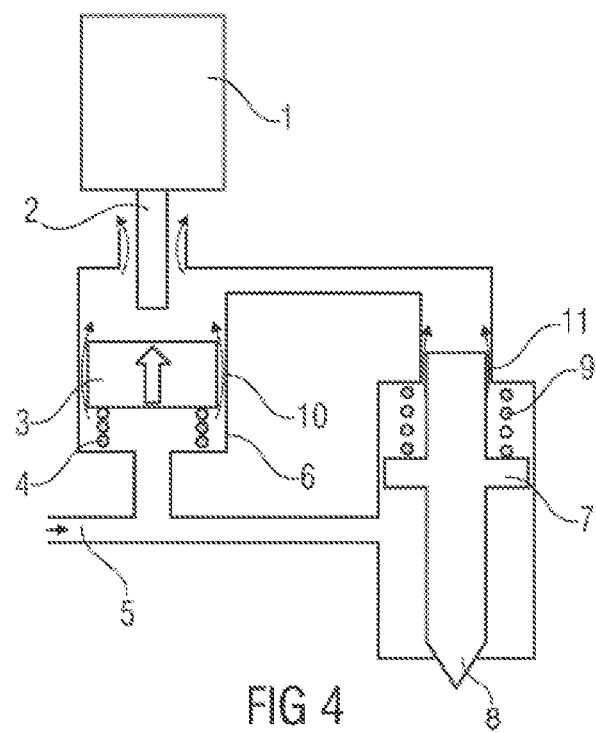
FIG. 4 shows an illustration corresponding to FIG. 3, which shows the piezo actuator in the contracted state with a damped resetting movement of the piston.

Then, the piezo actuator 1 is discharged by means of a very high current, with the result that the mechanical connection between the piston 3 and pin 2 is released. This is attributable to the fact that the piston 3 cannot follow the rapid movement of the piezo actuator 1 at the same speed. This state is shown in FIG. 4. The piston 3 instead follows with a damped speed. When the piston 3 impacts on the pin 2, the force effect on the piezo element causes a signal to be generated, which is detected, for example, as a change in capacitance. The time from the start of discharging up to the impact of the piston 3 on the pin 2 is then measured, and this time is used to characterize the coupling element.

Figure 2:
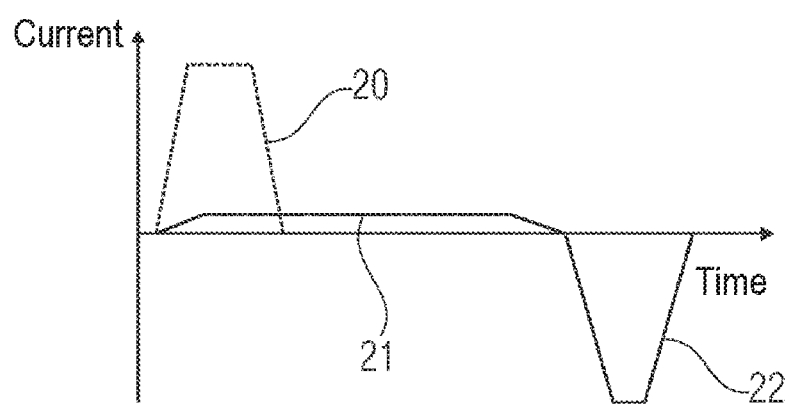
FIG. 2 shows the actuation profile for the test actuation of the piezo actuator.

FIG. 2 shows the actuation profile for the test actuation of the piezo actuator. In this context, the current is represented on the ordinate, and the time is represented on the abscissa. A typical charging current for activation of an injector is characterized by 20, said current not being used in the method described here. Instead, the operation is carried out here with the low charging current (shown at 21) for the test pulse. The low charging current is followed here by the high discharging current (represented at 22) which gives rise to a separation between the piston 3 and pin 2.

With the measured time, for example the wear of the coupling element or piston 3 can be detected. If the time is relatively short, the circulation around the piston 3 is relatively large, so that the wear can therefore be classified as high. If the measured time is, on the other hand, long, low circulation, and therefore a low level of wear, can be assumed.

What is claimed is:

1. A method for controlling a piezo fuel injector including a hydraulic coupling element with a piston placing a hydraulic medium under pressure and a piezo actuator with a pin connecting said piston to the piezo actuator, wherein the coupling element converts a translational stroke of the piezo actuator into a pressure differential to open a nozzle needle of the piezo fuel injector, the method comprising:
    applying a charging current to the piezo actuator, the charging current selected so that a leakage flow produced by the coupling element prevents development of a pressure differential and the nozzle needle remains closed;
    discharging the piezo actuator with an actuating current sufficient to release a mechanical connection between the piston and the pin;
    generating a signal when the piston impacts on the pin;
    detecting the signal;
    measuring an elapsed time from a start of discharging until the signal is detected;
    determining a characteristic of the coupling element based on the measured time; and
    controlling the actuation of the fuel injector based on the determined characteristic of the coupling element.

2. The method as claimed in claim 1, wherein the measured time is used to monitor wear of the coupling element.

3. A method for testing a piezo fuel injector including a hydraulic coupling element with a piston placing a hydraulic medium under pressure and a piezo actuator with a pin connecting said piston to the piezo actuator, wherein the coupling element converts a translational stroke of the piezo actuator into a pressure differential to open a nozzle needle of the piezo fuel injector, the method comprising:
    applying a charging current to the piezo actuator, the charging current selected so that a leakage flow produced by the coupling element prevents development of a pressure differential and the nozzle needle remains closed;
    discharging the piezo actuator with an actuating current sufficient to release a mechanical connection between the piston and the pin;
    generating a signal when the piston impacts on the pin;
    detecting the signal;
    measuring an elapsed time from a start of discharging until the signal is detected; and determining a characteristic of the coupling element based on the measured time;

wherein the characteristic of the coupling element represents a degree of mechanical wear of the coupling element.

4. The method as claimed in claim 3, further comprising controlling a actuation of the fuel injector based on the degree of mechanical wear of the coupling element.

5. A piezo fuel injector comprising:
a piezo actuator driven by a current source;
a hydraulic coupling element driven by the piezo actuator and converting extension of the piezo actuator into a pressure differential;
a nozzle needle actuated by the pressure differential;
a gap defined between the coupling element and a housing wall, the gap allowing a fuel to flow past the coupling element to the nozzle needle;
wherein the current source generates a charging current selected so low-enough that a leakage flow around the coupling element keeps the pressure differential low enough to prevent opening of the nozzle needle;
and the current source discharges the piezo actuator with an actuating current sufficient to release a mechanical connection between at least a part of the coupling element and the piezoactuator; and
a processor measuring an elapsed time from a start of discharging until impact of the coupling element on the piezo actuator, determining a characteristic of the coupling element based on the measured time, and operating the fuel injector based on the determined characteristic.

6. A piezo fuel injector as claimed in claim 5, further comprising a pin;
wherein the coupling element comprises a piston with a loose mechanical connection to the pin.

7. A piezo fuel injector as claimed in claim 6, wherein the piston moves in a pressure cylinder against a spring arranged in the pressure cylinder; and
wherein extension of the piezoactuator moves the piston against the force of the spring to pressurize a fuel and the nozzle needle opens in response to the pressurization.

* * * * *